United States Patent [19]

Summers

[11] 4,061,593

[45] Dec. 6, 1977

[54] STABILIZATION OF CALCIUM OXIDE SULFATE TRAPPING MATERIALS

[75] Inventor: Jack C. Summers, Troy, Mich.

[73] Assignee: General Motors Corporation, Detroit, Mich.

[21] Appl. No.: 762,676

[22] Filed: Jan. 26, 1977

[51] Int. Cl.$^2$ .................. B01J 27/20; B01J 29/00
[52] U.S. Cl. ................................ 252/443; 252/457
[58] Field of Search .............. 252/443, 457; 423/432

[56] References Cited

U.S. PATENT DOCUMENTS

| | | | |
|---|---|---|---|
| 3,133,824 | 5/1964 | Podschus | 423/432 X |
| 3,519,384 | 7/1970 | Engel et al. | 423/432 X |
| 3,935,294 | 1/1976 | Teller | 252/443 |

Primary Examiner—Patrick P. Garvin
Assistant Examiner—William G. Wright
Attorney, Agent, or Firm—George A. Grove

[57] ABSTRACT

Sulfate absorbent calcium hydroxide is dispersed in a binder and pelletized. The pellets are exposed to carbon dioxide at elevated temperatures to convert at least a portion of the calcium hydroxide to calcium carbonate. Pellets so treated are suitable for prolonged use in fixed volume sulfur oxide and sulfate scrubber vessels.

3 Claims, No Drawings

STABILIZATION OF CALCIUM OXIDE SULFATE TRAPPING MATERIALS

BACKGROUND OF THE INVENTION

This invention relates to a method of treating sulfur oxide and sulfate absorbent pellets wherein calcium compounds are the active absorbing agents to improve the physical characteristics of the pellets. More specifically, the subject invention relates to a method of treating pellets containing calcium oxide and calcium hydroxide so that they are dimensionally stable when employed to absorb sulfur oxides or sulfuric acid from high temperature combustion gases of sulfur containing hydrocarbon fuels.

It is well known that solid calcium hydroxide reacts with gaseous sulfur trioxide and sulfuric acid at elevated temperatures to form solid calcium sulfate. Thus, calcium hydroxide has been investigated as an absorber to entrain sulfates or sulfur oxides from hot combustion exhaust streams. Porous, unsintered pellets of calcium hydroxide containing small amounts of sodium oxide and silicon dioxide as binders have been formed for this purpose. Porous pellets are deemed a convenient form for the absorbent because they provide a large absorbent surface area and reproducible quantities can readily be loaded into fixed volume scrubbing vessels to treat exhaust gases without the pellets being carried away. However, when confined and closely packed in such a vessel and then exposed to a hot exhaust stream containing sulfur oxides, the pellets expanded and crumbled. This resulted in a significant flow restriction on the system. It is thus apparent that although calcium hydroxide based pellets are desirable for use in exhaust scrubbing applications because they are good sulfate absorbers, inexpensive to produce and nontoxic both before and after sulfate absorption, they cannot be used because of their poor physical characteristics. See the final report of phase one, Contract No. 68-03-0497 between Exxon Research and Engineering Company, Linden, N.J., and the Environmental Protection Agency, Ann Arbor, MI (1975).

I have discovered a method of treating calcium compound containing pellets so that they absorb gaseous sulfates without physical degradation. It is an object of my invention to provide a method of treating pellets initially containing calcium oxide and calcium hydroxide to transform at least a portion thereof to calcium carbonate. In contrast to the prior art pellets, pellets treated by my method are effective and durable in fixed volume sulfate scrubbers.

In accordance with a preferred embodiment of my invention, the above and other objects are accomplished by making calcined pellets nominally containing 85% by weight calcium hydroxide including traces of calcium oxide and carbonate, and about 15% of a sodium silicate based binder wherein the ratio of silica to sodium oxide is about two to one. The pellets are heated in an open container with carbon dioxide gas. For example, a 10% carbon dioxide-90% nitrogen atmosphere is suitable. The reaction with carbon dioxide is carried out at a temperature of at least 200° C. but no greater than 600° C. until a substantial percentage of the calcium has been converted to $CaCO_3$. At lower temperatures the conversion is too slow and at higher temperatures the strength of the pellets is decreased. The treated pellets are suitable for prolonged and effective use in fixed volume sulfate scrubbers.

In the preferred practice of my invention, pellets are formed from a major portion of a calcium compound convertible to calcium hydroxide and calcium oxide with calcining, and a minor portion of a sodium silicate binder. A higher proportion of the calcium compound ultimately increases the in-scrubber sulfate absorbing capacity of the pellets. However, at least 10% by weight of the sodium silicate binder is desirable in the calcined pellets to bind them together. Attempts to form pellets containing calcium carbonate in a single step without first forming pellets containing calcium oxide and calcium hydroxide and then treating them with carbon dioxide to form the carbonate were unsuccessful.

The practice of my invention is further illustrated by the following specific examples.

EXAMPLE I 1700 gms of calcium nitrate, 25 gms of calcined Kieselguhr and 118 gms of sodium metasilicate were dissolved in distilled water. 718 gms of sodium hydroxide dissolved in 705 ml distilled water were added dropwise with stirring to the first solution over a two-hour period. A precipitate formed and the mixture was stirred for an additional hour. The mixture was filtered through a Büchner funnel and the filter cake was washed twice with distilled water. The solids were dried overnight at about 120° C. and powdered to pass through a 14 Tyler mesh screen.

A binder solution of 90 parts trichloroethane and 10 parts polyethylene glycol (20,000 molecular weight) was prepared. The powder was dampened with trichloroethane and mixed with the binder solution on the basis of 95 parts by weight dry powder to 50 parts by weight binder solution. Sufficient trichloroethane was evaporated from the powder-binder slurry to permit granulation. The semi-dry mixture was sieved through a 20 mesh screen and dried at 65° C. for 1 hour. The granules were lubricated for compacting with a solution consisting of 90 parts by weight kerosene and 10 parts by weight oleic acid. Cylindrical pellets approximately 4.5 mm in length and 5.0 mm in diameter were formed from the mixture in a Dorst TPA-4 compacting press.

Portions of the batch of pellets were calcined at various temperatures and then treated with carbon dioxide. Specifically, the batch was divided into fourths which were separately heated for 2 hours in room air at temperatures of 300°, 450°, 600° and 750° C. The calcined pellets were analyzed by X-ray powder diffraction and were found to be nominally composed of 85% by weight of sulfate reactive calcium hydroxide (including traces of calcium oxide and carbonate) and 15% of a nonreactive sodium silicate binder consisting of about two parts by weight silicon dioxide to one part disodium oxide. The binders and lubricants used in pellet formation were released during clacining. The crush strengths of representative pellets from each calcining temperature were measured on a Schleuniger Model 2E tablet hardness tester. The four batches were then exposed to a 10% carbon dioxide-90% nitrogen atmosphere for 2 hours at 260° C. As can be seen in the Table I, the optimum axial crush strength of these pellets before $CO_2$ treatment was achieved by calcining at about 300° C., and that calcining at or above 600° C. decreases their axial crush strengths. It is also seen that the axial crush strength of the pellets can be further greatly increased by treating them with carbon dioxide and that the pellets both calcined and treated with carbon dioxide at 300° C. had the highest crush strengths. Treating the calcined pellets with carbon dioxide at temperatures above 600° C. did not significantly improve their crush strengths or increase their suitability for use in fixed volume scrubber vessels. The improvement in pelllet crush strength brought about by the carbon dioxide treatment is significant because it makes them suitable for use in fixed volume sulfate scrubbers and increases their in-scrubber durability.

Table I

Effects of Heating and Treating Pellets with $CO_2$

| Calcining Temperature (C °) | Axial Crush Strength Before $CO_2$ Treatment (kg) | Axial Crush Strength After $CO_2$ Treatment (kg) |
|---|---|---|
| 300 | 9.9 | 17.6 |
| 450 | 5.2 | 13.2 |
| 600 | 3.7 | 13.8 |
| 750 | 3.5 | 4.2 |

EXAMPLE II

A large batch of pellets compounded and formed as in Example I was treated as follows. Pellets were loaded into trays approximately 14 inches long, 10 inches wide and 2.5 inches high. The trays were stacked in a Harrop furnace and rapidly heated in air to a temperature of 315° C. The pellets were calcined at this temperature for 1 hour. It was then desired to treat the pellets with carbon dioxide.

A carbon dioxide generator was made by filling a 4,000 cc flask with dry ice, sealing a hose around the mouth of the flask, and running it directly into the furnace. A steady stream of carbon dioxide was generated by gently heating the flask. After the pellets had been calcined in air for about 1 hour; carbon dioxide was fed into the furnace from the flask generator. The furnace was maintained at 315° C. with a carbon dioxide atmosphere for an additional hour. The heat was then turned off but the flow of carbon dioxide was maintained during the 4 hour furnace cool-down cycle. This treatment yielded pellets with approximately the same crush strengths as those produced by the laboratory treatment when calcined at 300° C. and heated with $CO_2$. An elemental analysis of a random sample of pellets taken from this large batch of treated pellets showed that about 40% of the calcium hydroxide in the untreated pellets had been converted to calcium carbonate by the treatment.

EXAMPLE III

In order to demonstrate the in-scrubber durability of the carbon dioxide treated pellets, a 2,600 cc trapping vessel of the type used to contain active materials in automobile exhaust catalytic converters was filled with the pellets from Example II. The sulfate scrubbing vessel was placed downstream of a 4,300 cc catalytic converter which had been equilibriated to the unleaded gasoline used in the test. Exhaust gases were produced by a 3,800 cc engine coupled to a water brake dynamometer. An average of 0.14 l/km of a commercial unleaded gasoline with an average sulfur content of about 0.032 weight percent sulfur was burned by the engine throughout the equivalent of 32,200 km of road testing. The $CO_2$ treated pellets were removed from the scrubber and examined every 8,500 km. They did not crumble, or expand appreciably throughout the entire test as shown in Table II.

Table II

| Dimensions of $CO_2$ Treated Pellets | | |
|---|---|---|
| Distance (km) | Length (mm) | Diameter (mm) |
| 0 | 4.4 | 5.0 |
| 2,600 | 4.4 | 5.0 |
| 8,050 | 4.5 | 5.1 |
| 32,200 | 4.6 | 5.1 |

Moreover, the fresh carbon dioxide treated pellets absorbed over 90% of the exhaust gas sulfates in dynamometer testing and even after 32,000 km were absorbing over 70% of the sulfate emissions. The sulfur content of the pellets at 32,000 km was analyzed to be 15.7% by weight, corresponding to a transformation of about 90% of the calcium, calcium hydroxide, calcium oxide, and calcium carbonate in the pellets to calcium sulfates. Thus it can be seen that pellets treated by my method are particularly effective and physically suited for use in fixed volume scrubber vessels to absorb sulfates from automobile exhaust gases.

In contrast to Example III, the Final Report, Exxon-EPA Contract No. 68-03-0497 discloses the following. A batch of pellets was prepared substantially as in Example I, above, calcined at about 300° C., but not treated with carbon dioxide. A catalytic converter vessel was filled with these pellets and placed behind an Engelhard PTX-IIB ® catalytic converter on a 1973 351 CID V-8 Ford equipped with air pumps in the exhaust pipe to facilitate operation of the sulfate scrubber under high back pressure conditions. The automobile burned an unleaded gasoline with 0.032% by weight sulfur. After exposure to sulfate containing exhaust gases for only 3,200 km, a severe pressure drop across the sulfate scrubber with a concomitant increase in exhaust gas back pressure occurred. Incresed back pressure is detrimental to engine operation and was directly attributable here to the expansion of the untreated pellets and their reduction to dust which plugged the scrubber. These pellets (not treated with $CO_2$) proved to be unacceptable for use in fixed volume scrubber vessels.

Apart from the above Exxon work it has been observed that a batch of untreated pellets left in an open crucible crumbled to powder in 2 months. Carbon dioxide treated pellets which have been left in the open containers in contact with air for extended periods show no signs of deterioration, and do not decrease in crush strength. It is believed that the calcium carbonate formed in pellets by my carbon dioxide treatment creates a structurally sound carbonate matrix within the pellets which prevents their deterioration from exposure not only to sulfates but to the air as well. Any proportion of carbon dioxide gas in combination with gas or gases inert to the pellets may be used to treat the pellets. However, the rate of transformation of calcium hydroxide and calcium oxide to calcium carbonate increases as the proportion of carbon dioxide in the treatment gas increases.

Various combinations of sodium silicate based binders and calcium carbonate or their chemical precursors were combined in an effort to directly form a calcium carbonate containing pellet. This would have avoided the two step process of forming a calcium hydroxide pellet and heating it with $CO_2$. None of these attempts was successful. Either the powders produced could not be pelletized or if pellets could be formed they were so weak that many pellets deteriorated significantly upon handling.

In accordance with my invention, the calcium hydroxide pellets are treated with carbon dioxide in open containers to accommodate their expansion during the treatment. It is believed that the pellets expand during the carbon dioxide treatment because about one third or more of the calcium hydroxide is converted to the more bulky calcium carbonate. Then as such carbon dioxide treated pellets absorb sulfates, the calcium carbonate and any remaining calcium hydroxide are converted to calcium sulfate. The sulfates of calcium are only slightly larger than the carbonates so the pellets would not be expected to expand as much as would be the case if only calcium hydroxide were present. Surprisingly, however, in carbon dioxide treated pellets the transformation of the remaining calcium hydroxide and calcium oxide to calcium sulfate does not expand the pellets appreciably either. For example, about 60% of the calcium in the treated pellets of Example III was in the form of calcium hydroxide. About 90% of the molecular calcium reacted to form calcium sulfate after 32,200 km. Although an appreciable amount of calcium hydroxide was transformed to calcium sulfate the pellets expanded very little as seen in Table II. Untreated pellets, on the other hand expand and abrade, filling the void spaces in the scrubber and restricting the gas flow throughout.

The following experiment was run to test the effect of my carbon dioxide treatment on the expansion of calcined pellets as sulfates are absorbed. A batch of pellets was formed as in Example I. All of the pellets were calcined but only half of them were treated with carbon dioxide. The treated and untreated pellets were stacked end to end in separate sample tubes having sufficient room to allow the pellets to freely expand. The tubes in turn were placed in a test chamber and exposed to low pressure sulfurous exhaust gases for 9 hours. The pellets were removed from the tubes and measured. The untreated pellets were carefully handled to keep them from crumbling and were found to have expanded an average of 35% in volume. The pellets treated in accordance with my invention expanded only 1.8%. This low coefficient of expansion coupled with the higher crush strengths of treated pellets accounts, at least in part, for their remarkable in-scrubber durability.

The term sodium silicate binder as used herein in reference to calcined pellets refers to the use of any of the family of known suitable sodium silicates in which the oxides of sodium and silica may be present in varying amounts.

Although the pellets can be calcined at temperatures between 300° and 750° C., it has been found that the optimum calcining temperature is about 300° C. (e.g., see Table I). The calcining treatment increases the strength of the fresh pellets, and evaporates the binders used in forming the pellets from powder.

While my invention has been disclosed in terms of specific embodiments thereof, it will be appreciated that other forms could readily be adapted by one skilled in the art. Accordingly, the scope of my invention is to be considered limited only by the following claims.

What is claimed is:

1. A method of making durable absorbent pellets suitable for use in fixed volume scrubber vessels for removing sulfur oxides and sulfates from the combustion gases of sulfur containing hydrocarbon fuels comprising the steps of
    making calcined pellets comprising a sodium silicate binder and an absorbent taken from the group consisting of calcium oxide and calcium hydroxide, the binder making up at least 10% by weight of said pellets, and
    reacting said pellets with carbon dioxide gas at a temperature in the range from about 200° to 600° C. to convert at least about one third of the calcium therein to calcium carbonate, the resulting calcium containing pellets being effective and durable absorbents when used in said fixed volume scrubber vessels.

2. A method of making durable absorbent pellets suitable for use in fixed volume scribber vessels for removing sulfur oxides and sulfates from the combustion gases of sulfur containing hydrocarbon fuels comprising the steps of
    making pellets comprising a sodium silicate binder and an absorbent taken from the group consisting of calcium oxide and calcium hydroxide, the binder maing up at least 10% by weight of said pellets,
    calcining said pellets at a temperature in the range of about 300° to 600° C., and
    reacting said pellets with carbon dioxide gas at a temperature in the range from about 200° to 600° C. to convert at least about one third of the calcium therein to calcium carbonate, the resulting calcium containing pellets being effective and durable absorbent when used in said fixed volume scrubber vessels.

3. A method of making a durable pelletized absorbent suitable for use in fixed volume scrubber vessels for removing sulfur oxides and sulfates from the combustion gases of sulfur containing hydrocarbon fuels comprising the steps of
    forming the pellets containing calcium oxide, calcium hydroxide or a calcium compound that will convert to calcium oxide or calcium hydroxide and a sodium silicate binder,
    calcining the pellets at a temperature of about 300° C., said pellets comprising an absorbent taken from the group consisting of calcium oxide and calcium hydroxide, and at least 10% by weight of a sodium silicate binder, and
    reacting said pellets with carbon dioxide gas at a temperature of about 300° C. to convert about 40% or more of the calcium therein to calcium carbonate, the resulting calcium carbonate containing pellets being effective and durable absorbents when used in said fixed volume scrubber vessels.

* * * * *

UNITED STATES PATENT AND TRADEMARK OFFICE
CERTIFICATE OF CORRECTION

PATENT NO. : 4,061,593
DATED : December 6, 1977
INVENTOR(S) : Jack C. Summers

It is certified that error appears in the above-identified patent and that said Letters Patent are hereby corrected as shown below:

Column 2, line 58, "clacining" should read -- calcining --.

Column 3, line 8, "pelllet" should read -- pellet --.

Column 4, line 37, "Incresed" should read -- Increased --.

Column 6, line 29, "maing" should read -- making --; lines 36 and 37, "absorbent" should read -- absorbents --.

Signed and Sealed this

Fourth Day of April 1978

[SEAL]

Attest:

RUTH C. MASON
Attesting Officer

LUTRELLE F. PARKER
Acting Commissioner of Patents and Trademarks